April 30, 1940.　　　　C. S. LORD　　　　2,198,674
ENGINE UNIT TRANSPORTATION MOUNTING APPARATUS AND METHOD
Filed July 15, 1937
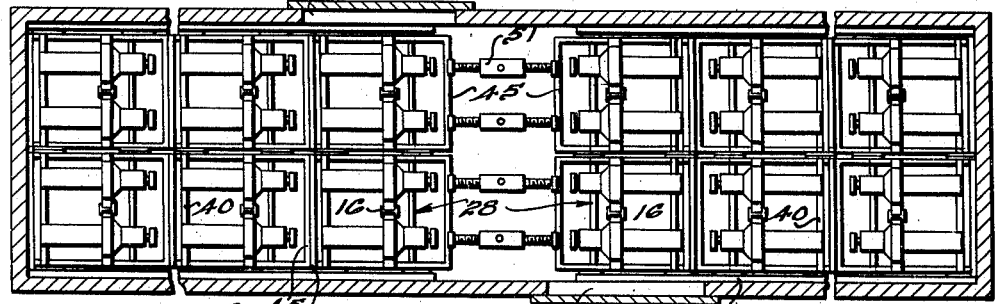
INVENTOR
CHARLES S. LORD.
BY
ATTORNEYS.

Patented Apr. 30, 1940

2,198,674

UNITED STATES PATENT OFFICE 2,198,674

ENGINE UNIT TRANSPORTATION MOUNTING APPARATUS AND METHOD

Charles S. Lord, Detroit, Mich., assignor to Chrysler Corporation, Highland Park, Mich., a corporation of Delaware Application July 15, 1937, Serial No. 153,732

5 Claims. (Cl. 211—13)

This application is directed to an improved portable internal combustion engine unit transportation mounting apparatus and method.

It is an object of my invention to provide an improved means for supporting internal combustion engine units during shipment, which is conveniently movable in loaded condition to and from a freight car or other transportation vehicle.

A further object of the invention is the provision of rack-like supporting means of this character on which groups of engine units of the type used in automobiles may be safely supported in spaced relationship without danger of injury to any of the parts thereof.

More specifically, the invention has for one of its objects the provision of a rack of this kind which is adapted to support the engine units at the points and by the brackets normally used to mount these engines in vehicle chassis frames.

Another object of my invention is to provide racks of this kind by virtue of which a substantially larger number of motor units can be accommodated in a freight car than heretofore.

Additional objects of the invention are to provide a rack of this kind in which engine units including engine, transmission, clutch, generator, and other similar portions can be shipped assembled with their parts in their normal relationship; to provide on the rack structure mountings for the engine units on which the latter may be placed by vertical downward movement of the engine units during the loading operation; to provide a rack of the aforesaid kind in which two tiers of engine units are receivable and which has an upper tier-carrying structure that is conveniently removable to facilitate the loading of the lower tier of engines; to provide an improved means for anchoring both loaded and unloaded racks of this kind in a freight car; to provide means for detachably securing the racks of this kind to the freight car so that they may be conveniently supported in transit; to provide racks of this kind that are loaded to such an extent that by reason of their load weight they tend to stay in place; and to provide improved means for guiding motor units into their intended position so that the engine brackets that are normally intended to support the engine will register with the rack structure provided for their securement and support.

Other objects and advantages of the invention will be more apparent from the following description taken in connection with the accompanying drawing, in which:

Fig. 1 is a perspective view of my internal combustion engine unit transportation mounting apparatus.

Fig. 2 is a fragmentary side elevational view showing a portion of the rack and engine unit structure as viewed from the general direction indicated by the arrows 2 of Fig. 1.

Fig. 3 is a fragmentary horizontal sectional view of a freight car showing an advantageous arrangement of racks embodying the invention therein.

Fig. 4 is a perspective view of a truck by which racks embodying the invention can be conveniently loaded into and removed from a freight car.

In the drawing is illustrated an engine unit support rack which includes a horizontal base portion, generally designated by the numeral 5, comprising front and rear channel members 6 and end channel members 7. Extending between and fixed between end members 7, and extending between and fixed to the side members 6, are reinforcing members 8 and 9 respectively which form a grill-like structure. The base 5 is supported by upright pairs of legs 9' and 10 which extend below the base and a substantial distance above the latter.

The upper end portions of the legs 10, which extend above the upper extremities of the legs 9', are connected together by inclined channel bars 11 having substantially horizontal sections near their opposite extremities. Mounted on the end members 7 and channel bars 11 of each respectively opposite end of the rack are upstanding channel bars 12, and an upright post 13 is disposed midway between the channel bars 12 and located substantially in alignment therewith. The post 13 is of I shaped cross-section and has vertical channel ways 14 on its respectively opposite sides.

A flange 15 is disposed transversely of each channel way 14 of the post 13 in order to provide a substantially horizontal seat. Mounted on the adjacent sides of the upright channel members 12 are channel shaped brackets 16 each of which is provided between its sides with a horizontally extending flange 17, as illustrated in Fig. 1.

The flanges 15 and 17 of both channel members 12 and both channel ways 14 are located in substantially the same horizontal plane, and the similar ways in which they are disposed have opposite extremities which are also located in the same horizontal plane.

The foregoing horizontal seats 15 and 17 are provided for supporting the rear end portion of an engine unit in a manner hereinafter set forth. A longitudinally extending channel member 18, which is mounted on the end channel members 7 and secured to the legs 10, is provided for supporting the front end portion of the engine unit. Mounted on the channel member 18 are brackets 19 having oppositely inclined facing edge portions 20 between which a somewhat correspondingly shaped front end part of the internal combustion engine unit is receivable. The brackets 19 thus provide spaced downwardly tapering recesses substantially in alignment with the space between the channel ways 14 and 16.

The foregoing structure is particularly adapted to support a pair of engine units 21 which constitute the lower tier of the rack, one of which is illustrated in dot and dash lines in Fig. 1. The particular motor units illustrated have laterally extending arm structures 22 which are located at the rear end portion of the engine part of the unit and which are normally employed to support the rear end portion of the unit in a vehicle chassis frame.

The outer extremities of the arms 22 are receivable in the channel ways 16 and 14 during lowering of the engine units onto the rack. Provided on the front end portions of the engine units are supporting plates 23 having substantially horizontal flange portions 24 which are adapted to register with and seat upon the upper channel flange of the member 18.

The lower edge portions of the engine mounting arms 22 are adapted to seat upon the horizontal flanges 15 and 17 which extend transversely of the channel ways 14 and 16 respectively. The channel ways 14 and 16 guide the rear end portion of each engine unit into its proper position, and the inclined edge portions 20 of the brackets 19 pilot the mounting plate 23, which is also used to normally support the engine in a vehicle chassis, into registration with the upper flange of the bar 18.

A pilot pin 25 preferably extends upwardly from the upper flange of the channel bar 18 and is received in one of the apertures 26 with which the flange portion 24 of the mounting plate 23 is provided for normal securing of the engine unit in the chassis frame of the vehicle.

If desired, a bolt 27 may be extended through an aperture in the upper flange of the channel member 18 and one of the apertures normally provided in the flange portion of the mounting plate 23 in order to detachably secure the front end of the engine unit to the rack.

During mounting of the lower tier of engine units in the rack the space at the upper end portion of the latter is substantially unobstructed in order to accommodate convenient lowering of the units into their respective positions. After the lower tier of the rack has been loaded, a detachable longitudinally extending supporting bar, generally designated by the numeral 28, is mounted on the upstanding channel bars 12 at a location above the inclined channel bars 11.

The supporting bar 28 comprises a pair of channel members 29 arranged with their web sides in facing relationship and held apart by blocks 30 at a distance slightly greater than the width of the channel bars 12. The channel members 29 and blocks 30 are secured together by bolts 31 extending through registering apertures therein.

Extending between and secured to the channel bars 29 at the longitudinal mid-portion thereof is an upwardly extending post 32 having opposite channel ways 33 in its respectively opposite sides across which horizontal flanges 36 extend. Mounted on the upper end portions of the upright channel bars 12 are channel shaped brackets 37 having their channel ways 38 facing inwardly toward and in alignment with the channel ways 33 of the post 32.

The rear motor mounting arms 22 of the engine units of the upper tier thereof are receivable in the channel ways 33 and 38 during lowering of each engine unit into its intended position in the upper part of the rack. The lower edge portions of the supporting arms 22 are adapted to seat upon the horizontal flanges 36 of the post 32 and correspondingly located horizontal flanges 39 which extend transversely of the channel ways 38 of the brackets 37. In this manner the rear end portions of the upper tier are supported in substantially the same way as those of the units of the lower tier.

A removable longitudinally extending bar 40 is detachably mounted on the inclined channel bars 11 adjacent the upper end portions of the legs 10. This supporting bar has upwardly extending spaced brackets 41 mounted on its upper flange which are provided with oppositely inclined edge portions 42 which serve to pilot the front motor mounting plate 23 of the engine unit into proper position.

The front engine mounting plates of the units of the upper tier may be secured to the supporting bar 40 in the manner illustrated in Fig. 2 and described previously. After the engine units of the lower tier have been placed upon the rack, the supporting bars 28 and 40 are arranged in their proper positions and preferably detachably secured thereto by bolts 43 and 44 respectively. In unloading the rack the engine units of the upper tier are removed first and the supporting bars 28 and 40 are removed to permit vertically upward displacement of the engine units of the lower tier.

Each engine unit supporting rack is provided with a bumper 45 which extends sufficiently in advance of the legs 9' to protect the rear end portions of the engine units which protrude beyond the plane of the legs 9' from injury. Apertures 46 are preferably formed in gusset plates 47 mounted on the legs 9' and in the legs 10 in order to facilitate attachment of the rack to a channel bar 48 which is preferably permanently mounted in a freight car or other vehicle in which the racks are transported.

The greatest dimension of the horizontal section taken through the bumper 45 of the rack shown in the drawing, is in the direction normal to the length of the bumper, and thus the length of the bumper extends from the bumper 45 to a bar 52 mounted on the legs 10 at the same elevation as the bumper. The dimensions, however, may vary to correspond with the shape of the space in which the racks are to be stored for shipment and in some cases the lengths of the rack may be at right angles to the lengths illustrated.

In mounting loaded racks embodying my invention in freight cars of conventional construction, such as that illustrated in Fig. 3, the loaded racks are preferably lifted by a truck having a vertically movable platform which is receivable between the lower end portions of the rack and beneath the base thereto. The loaded rack, which is supported on the truck with a platform 60 thereof extending lengthwise of the rack and substantially parallel to the end channel bars 7, may be carried by the truck through the doorway 50 of the freight car and deposited in one corner thereof, for example, at the right end of the freight car as viewed in Fig. 3. The next rack to be introduced into the freight car is deposited in lateral alignment with the first mentioned rack. Thereafter, successive racks are arranged in pairs longitudinally of the freight car until the space on the right hand side of the door-way, as viewed in Fig. 3, has been filled. The racks are preferably of such width that a pair of them occupies substantially the entire width of the freight car.

All succeeding racks except the last pair to be introduced into the freight car, are similarly deposited in the left end of the freight car as viewed in Fig. 3, in pairs longitudinally aligned in the freight car. The left end of the freight car is thus filled up to the left side extremity of the door-way 50 or, if desired, to a location, spaced from the last pair of racks loaded in the right end portion of the car, at a distance registering with the door of the car and equal to the length of the racks and an additional distance.

The door-way 50 is somewhat wider than the widths of the racks and, therefore, the last pair of racks to be loaded in the car is moved through the door with the lengths thereof extending width-wise of the door. This is accomplished by inserting the platform of the truck, illustrated in Fig. 4, between the legs 9'—9' and 10—10 and substantially parallel to the side members 6 of the base of the rack, and transporting the racks through the door and depositing them in alignment with the previously located racks. The dimensions of the racks are such that when eighteen thereof are placed in a freight car of conventional construction, sufficient space is provided between the racks of the left and right end portions of the freight car to accommodate spreading jacks 51 which are disposed between opposing bumpers 45 and expanded longitudinally of the car in order to forcefully urge the bumper of each longitudinally aligned rack with a bumper bar 52 of the next adjacent rack, the bumper bar 52 being secured to the legs 10 and located at the same elevation as the bumper 45.

Engine units mounted on racks embodying the invention may be conveniently moved in groups into the freight car and out therefrom without requiring manual manipulation beyond that required to operate the truck. The racks may be transferred from a freight car to a motor vehicle and carried to their destination at which location the units may be removed, and the racks may be returned to the freight car to be brought back again.

All this is accomplished without the necessity of a special construction of freight car and building and knocking down of wooden frame-work, which it has been heretofore the practice to employ.

Various modifications and changes may be effected in my application without departing from the spirit of my invention or from the scope of the appended claims.

What I claim is:

1. A rack for supporting in spaced relation a plurality of engine units each having fixtures thereon for normally supporting their opposite end portions during operation thereof comprising a frame structure having an open upper extremity for accommodating substantially vertical passage of said units therethrough, spaced substantially upstanding channel members having facing channel ways for receiving portions of the fixtures of one end portion of each unit respectively and for confining movement thereof to a substantially vertical course, seats extending transversely of said channel-ways for receiving portions of said fixtures extending thereinto and for supporting said end portion of said unit, and a seat for each unit so located on said frame structure as to register with the fixture of the opposite end portion thereof when the fixtures of the first mentioned end portion of said unit are engaged in said channel ways.

2. A rack for supporting in spaced relation a plurality of engine units each having fixtures thereon for normally supporting their opposite end portions during operation thereof comprising a frame structure having a lower base portion for supporting a lower tier of said units, means on said base portion for co-acting with the fixtures of one end portion of each of said units for guiding the latter into and supporting and confining the same in predetermined positions in said rack, a support on said base portion engageable with a fixture of the other end portion of each of said units respectively for supporting the latter end portions of said units, and means on said frame structure, above said base portion for supporting a second tier of said units, said latter means comprising members for co-acting with certain of said fixtures of said units to support the latter and bars extending over the space in said rack for accommodation of said lower tier and removable from said frame structure for accommodating loading of the lower tier of said rack, said bars providing support for other fixtures of said units in said upper tier of units.

3. A rack for supporting an engine unit having a centrally located fixture at one end and laterally protruding fixtures at its opposite end portion for normally supporting it during operation including a frame structure, spaced vertically extending channel members having channel-ways facing each other for receiving the outer end portions of said laterally protruding fixtures and having a seat portion extending transversely of said channel-ways and engageable by said laterally protruding fixtures for supporting said unit, and a support on said frame structure for receiving said centrally located fixture when said other fixtures are engaged in said channel-ways, said channel members having vertical side flanges extending transversely of the length of the space occupied by said unit and spaced slightly further apart than the thickness of said end portions for confining said unit against longitudinal movement and for piloting said centrally located fixture into engagement with said support.

4. A rack for supporting an engine unit having a centrally located apertured fixture at one end and having laterally protruding fixtures at its opposite end portion for normally supporting it during operation including a frame structure, spaced vertically extending channel members having channel-ways facing each other for receiving the outer end portions of said laterally protruding fixtures and having a seat portion extending transversely of said channel-ways and engageable by said laterally protruding fixtures for supporting said unit, and a support on said frame structure for receiving said centrally located fixture when said other fixtures are engaged in said channel-ways, said support including a pin receivable in one of the apertures of said central fixture for holding the corresponding end of said unit against displacement, said channel members having vertical side flanges extending transversely of the length of the space occupied by said unit and spaced slightly further apart than the thickness of said end portions for confining said unit against longitudinal movement and for piloting said centrally located fixture into engagement with said support.

5. A rack for supporting a plurality of engine units of the type used in motor vehicles and which have motor mounting fixtures thereon including a frame structure comprising spaced vertically extending leg members and a lower base portion, means on said lower base portion for co-acting with said mounting fixtures of a lower tier of said units, and means mounted on said frame structure for coacting with the mounting fixtures of an upper tier of said units, said latter means including elements fixed to said frame structure and located in unobstructing position with respect to a passage through said frame structure for accommodating placement of the units of said lower tier on said base portion and including detachable elements normally in obstructing relationship with respect to said passage when attached to said frame structure.

CHARLES S. LORD.